United States Patent
Shen et al.

(10) Patent No.: US 10,867,150 B2
(45) Date of Patent: Dec. 15, 2020

(54) FAST FINGER SETTLEMENT DETECTION FOR FINGERPRINT SENSORS

(71) Applicant: Synaptics Incorporated, San Jose, CA (US)

(72) Inventors: Guozhong Shen, San Jose, CA (US); Ozan Ersan Erdogan, Saratoga, CA (US); Syed Mahmud, Dublin, CA (US); Philip Yiu Kwong Chan, Fremont, CA (US); Nan Wang, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 124 days.

(21) Appl. No.: 16/129,195

(22) Filed: Sep. 12, 2018

(65) Prior Publication Data

US 2019/0080135 A1 Mar. 14, 2019

Related U.S. Application Data

(60) Provisional application No. 62/557,577, filed on Sep. 12, 2017.

(51) Int. Cl.
*G06K 9/00* (2006.01)
(52) U.S. Cl.
CPC ....... *G06K 9/0002* (2013.01); *G06K 9/00053* (2013.01)
(58) Field of Classification Search
CPC .................. G06K 9/0002; G06K 9/00053
See application file for complete search history.

(56) References Cited

U.S. PATENT DOCUMENTS

| | | | | |
|---|---|---|---|---|
| 7,102,364 | B2* | 9/2006 | Umeda | G06K 9/0002 324/658 |
| 8,872,526 | B1* | 10/2014 | Hoshtanar | H03K 17/9622 324/658 |
| 10,089,514 | B1* | 10/2018 | Shen | G06K 9/0002 |
| 2013/0258142 | A1 | 10/2013 | Russo | |
| 2014/0015793 | A1* | 1/2014 | Chen | G06F 3/044 345/174 |
| 2014/0198960 | A1 | 7/2014 | Thompson et al. | |

(Continued)

OTHER PUBLICATIONS

Tucholski, A., "TPC1021/FPC2050 Fingerprint Sensor Implementation and Technology," Huawei Honor POK-TL101H Phone, Competitive Analysis Team, Jan. 6, 2016.

*Primary Examiner* — John B Strege
(74) *Attorney, Agent, or Firm* — Leydig, Voit & Mayer, Ltd.

(57) ABSTRACT

Low power input object settlement detection systems and methods for operating a capacitive sensor having a plurality, M, of transmitter electrodes and a plurality, N, of receiver electrodes, wherein N and M are integer values. A plurality of input object settlement scans are captured, when a presence of an input object is detected, or in response to a presence of an input object being detected, wherein capturing each input object settlement scan includes driving all or a portion of the plurality, M, of transmitter electrodes simultaneously and detecting receiver signals from at least a subset of the plurality, N, of receiver electrodes simultaneously. When a difference between subsequent input object settlement scans is below a threshold value, a full input object image is acquired.

18 Claims, 4 Drawing Sheets

(56) References Cited

U.S. PATENT DOCUMENTS

| | | | |
|---|---|---|---|
| 2015/0070137 A1 | 3/2015 | Minteer et al. | |
| 2016/0291765 A1* | 10/2016 | Shen | G06F 3/0416 |
| 2017/0344803 A1* | 11/2017 | Zhou | G06K 9/00013 |
| 2018/0012057 A1* | 1/2018 | Cho | G06F 21/32 |
| 2018/0025199 A1* | 1/2018 | Ryshtun | G06K 9/0008 |
| | | | 382/125 |
| 2018/0314379 A1* | 11/2018 | Shen | G06F 3/0416 |
| 2020/0081575 A1* | 3/2020 | Li | G06K 9/0002 |

* cited by examiner

FAST FINGER SETTLEMENT DETECTION FOR FINGERPRINT SENSORS

CROSS REFERENCES

The present Application for Patent claims priority to U.S. Provisional Patent Application No. 62/557,577, entitled "FAST FINGER SETTLEMENT DETECTION FOR FINGERPRINT SENSORS," filed Sep. 12, 2017, which is incorporated herein by reference in its entirety.

FIELD

The present disclosure generally provides systems and methods for electronic sensing, and more particularly, for capacitive fingerprint sensing.

BACKGROUND

Biometric authentication systems are used for authenticating users of devices incorporating the authentication systems. Among other things, biometric sensing technology can provide a reliable, non-intrusive way to verify individual identity for authentication purposes.

Fingerprints, like various other biometric characteristics, are based on unalterable personal characteristics and thus are a reliable mechanism to identify individuals. There are many potential applications for utilization of biometric and fingerprints sensors. For example, electronic fingerprint sensors may be used to provide access control in stationary applications, such as security checkpoints. Electronic fingerprint sensors may also be used to provide access control in portable applications, such as portable computers, personal data assistants (PDAs), cell phones, gaming devices, navigation devices, information appliances, data storage devices, and the like. Accordingly, some applications, particularly portable applications, may require electronic fingerprint sensing systems that are compact, highly reliable, and inexpensive.

Constantly scanning a fingerprint sensor array to capture an image may unnecessarily consume power when there is no corresponding fingerprint to be imaged. To minimize power consumption, a fingerprint presence detection system is often used to detect the presence of a finger before entering a higher power fingerprint imaging mode.

In view of the above, there is a need for a finger presence detection system of a fingerprint sensor that provides an accurate indication of finger presence over a sensor. These and other advantages of the disclosure, as well as additional inventive features, will be apparent from the description of the disclosure provided herein.

BRIEF SUMMARY

The present disclosure provides low power input object settlement detection systems and methods, with reduced power consumption and decreased latency.

According to an embodiment, a method is provided for operating a capacitive sensor having a plurality, M, of transmitter electrodes and a plurality, N, of receiver electrodes, wherein N and M are integer values. The method includes capturing a plurality of input object settlement scans, when a presence of an input object is detected, or in response to a presence of an input object being detected, wherein capturing each input object settlement scan includes driving all or a portion of the plurality, M, of transmitter electrodes simultaneously and detecting receiver signals from at least a subset of the plurality, N, of receiver electrodes simultaneously. The method also may include determining whether a difference between subsequent input object settlement scans is below a threshold value, and when the difference is below the threshold value, acquiring a full input object image.

According to another embodiment, an electronic system for capacitive sensing is provided. The electronic system may include a capacitive sensor configured to capacitively sense an input object in proximity to a plurality of sensor electrodes comprising a plurality, M, of transmitter electrodes, and a plurality, N, of receiver electrodes, wherein N and M are integer values, and a processing system configured to drive the plurality, M, of transmitter electrodes and to detect receiver signals from the plurality, N, of receiver electrodes. The processing system may be configured to control the capacitive sensor to capture a plurality of input object settlement scans, when a presence of an input object is detected, wherein capture of each input object settlement scan includes driving all or a portion of the plurality, M, of transmitter electrodes simultaneously and detecting receiver signals from a subset of the plurality, N, of receiver electrodes simultaneously. The processing system also may be configured to determine whether a difference between subsequent input object settlement scans is below a threshold value, and when the difference is below the threshold value, acquire a full input object image.

According to yet another embodiment, an electronic device for capacitive fingerprint sensing is provided. The electronic device includes a capacitive fingerprint sensor having a plurality of sensor electrodes comprising a plurality, M, of transmitter electrodes, and a plurality, N, of receiver electrodes, wherein N and M are integer values, wherein the capacitive fingerprint sensor is configured to capacitively sense an input fingerprint on an input surface in proximity to the plurality of sensor electrodes, and a processing system comprising one more processing elements, the processing system coupled to the capacitive fingerprint sensor and configured to drive the plurality, M, of transmitter electrodes and to detect receiver signals from the plurality, N, of receiver electrodes. The processing system is configured to control the capacitive sensor to capture a plurality of input fingerprint settlement scans, when a presence of an input fingerprint is detected, wherein capture of each input fingerprint settlement scan includes driving all or a portion of the plurality, M, of transmitter electrodes simultaneously and detecting receiver signals from a subset of the plurality, N, of receiver electrodes simultaneously. The processing system may also be configured to determine whether a difference between subsequent input object settlement scans is below a threshold value, and when the difference is below the threshold value, acquire a full input object image.

According to yet a further embodiment, a control circuit for controlling capacitive sensing operations of a capacitive sensor is provided. The control circuit typically includes a processor, at least one transmitter lead for connecting to a plurality, M, of transmitter electrodes of a capacitive sensor, and at least one receiver lead for connecting to a plurality, N, of receiver electrodes of the capacitive sensor. The control circuit is configured to control the capacitive sensor to capture a plurality of input object settlement scans, when a presence of an input object is detected, wherein capture of each input object settlement scan includes driving all or a portion of the plurality, M, of transmitter electrodes simultaneously and detecting receiver signals from a subset of the plurality, N, of receiver electrodes simultaneously. The control circuit is also configured to control the sensor to determine whether a difference between subsequent input object settlement scans is below a threshold value, and when the difference is below the threshold value, control the capacitive sensor to acquire a full input object image.

In certain embodiments, acquiring a full input object image includes applying each of a plurality, M, of distinct modulation signals in a sequence to all the plurality, M, of transmitter electrodes simultaneously. In some embodiments, the distinct modulation signals may be applied to fewer than all of the transmitter electrodes. In certain embodiments, driving all or a portion of the plurality, M, of transmitter electrodes simultaneously includes applying a driving subset of a plurality, M, of distinct modulation signals in a sequence to all or the portion of the transmitter electrodes, the driving subset comprising M–X of the distinct modulation signals, wherein X is an integer value less than M.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE SEVERAL VIEWS OF THE DRAWING(S)

The detailed description is described with reference to the accompanying figures. The use of the same reference numbers in different instances in the description and the figures may indicate similar or identical items.

DETAILED DESCRIPTION

Figure 1:
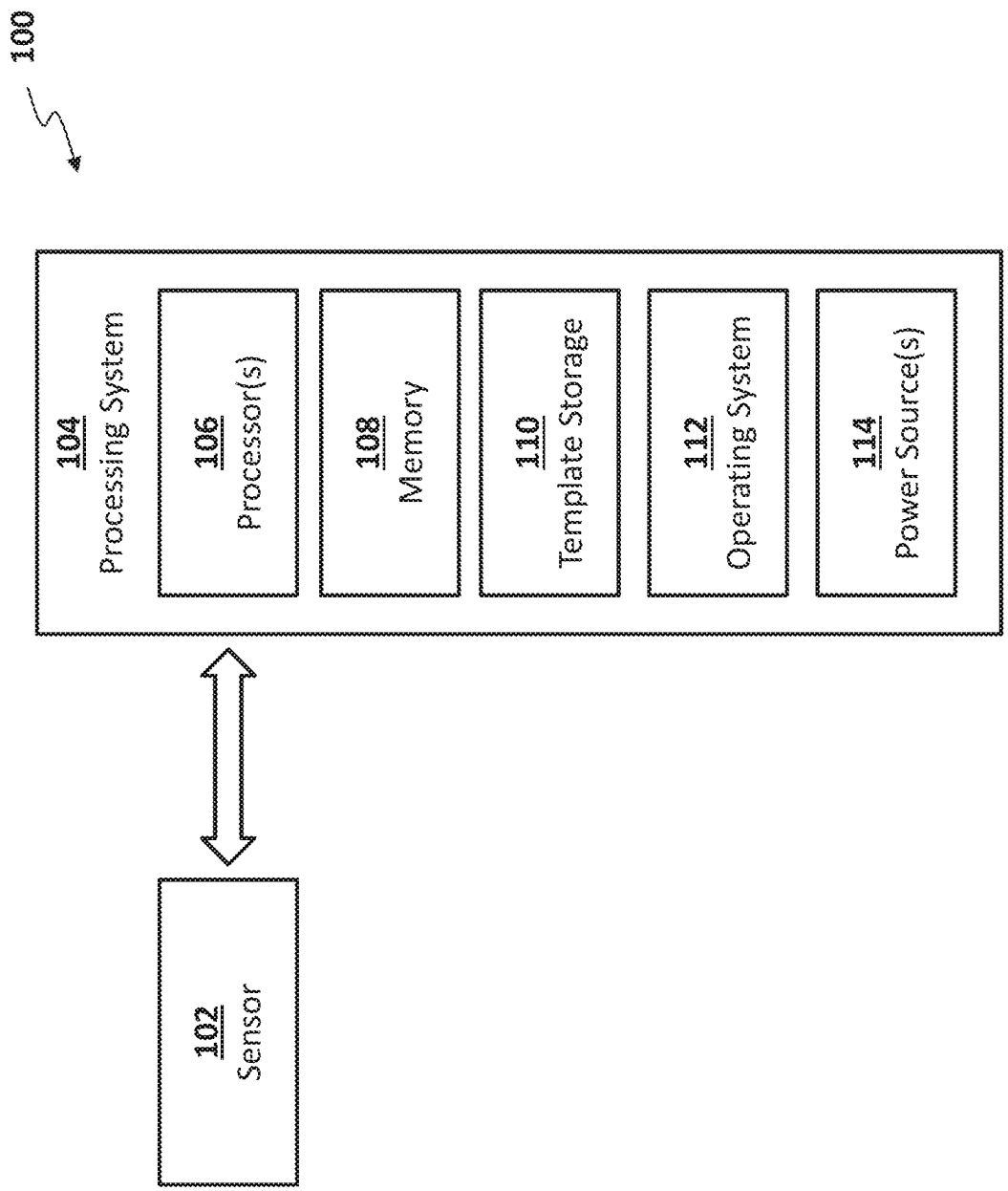
FIG. 1 is a block diagram of an exemplary system that includes an input device and a processing system, in accordance with an embodiment of the disclosure.

Embodiments provide a scan technique that quickly and efficiently detects input object settlement in a sensing area or region of an input device.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

One way to detect presence of a finger or other input object is to use one or more dedicated presence sensing elements on the input device. For example, in a fingerprint sensor, finger presence sensing electrodes may be used in addition to the electrodes of a sensing array that are used to capture an image of a fingerprint in a sensing region of the input device.

Another way to detect presence of a finger or other input object is to re-use selected sensor electrodes of the sensor array as presence sensing electrodes for presence detection. This embodiment may allow space to be saved by avoiding a need for dedicated presence sensing electrodes, as well as allowing for more accurate presence detection by using electrodes for presence detection that coincide with the sensor array.

A drawback to using presence sensing electrodes, either dedicated or not, is that typically, in certain embodiments of the input device, the presence sensing electrodes may be disposed underneath a cover layer, e.g., a cover lens or cover glass. An example of a cover layer might be a glass or polymer material overlaying the fingerprint sensor, where a surface of the glass or polymer material acts as the input surface. Because the electrodes are disposed underneath the cover layer, a portion of an electric field utilized to detect the presence of an input object, such as a fingerprint when the input device is configured as a fingerprint sensor, may not be exposed outside of the cover layer. Also, this portion of the electric field not exposed outside of the cover layer may increase as a cover layer thickness increases. As such, any such signal indicating the presence of an input object may not have high gain to amplify the signal. Accordingly, a sensitivity of the input device may be affected by the thickness of the cover layer.

For example, in certain embodiments, an input device of a smart phone may include presence sensing electrodes for detecting an input object, such as a fingerprint. Regardless of whether the presence sensing electrodes are either dedicated presence sensing electrodes or selected sensor electrodes of the sensor array, the presence sensing electrodes may be disposed under a cover lens of the smart phone. As such, a portion of the electric field utilized to detect the presence of the fingerprint may not be exposed outside of the cover lens, which may reduce the sensitivity of the input device.

An additional drawback to using presence sensing electrodes for presence detection of an input object is that the sensor electrodes and their associated circuitry, such as one or more amplifiers, are exposed to temperature fluctuations within the device. As the temperature of the device changes, the output of the one or more amplifiers may be affected. This may cause drift in the output of the one or more amplifiers and make the detection of the input object more difficult.

To address the various drawbacks, signal conditioning elements are added in parallel to the presence sensing electrodes. The signal conditioning elements may be added in parallel regardless of whether the presence sensing electrodes are dedicated or not. By doing so, the sensitivity of an output signal from the presence sensing electrodes may be increased such that the signal can be amplified with high gain. Further, one or more comparator devices may be implemented on the output of the presence sensing electrodes so to compare the output to threshold values in order to monitor and correct any drift experienced from temperature or other negative environmental factors.

Turning now to the figures, FIG. 1 is a block diagram of an electronic system or device 100 that includes an input device such as sensor 102 and processing system 104, in accordance with an embodiment of the disclosure. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic devices include composite input devices, such as physical keyboards and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic device 100 could be a host or a slave to the sensor 102.

Sensor 102 can be implemented as a physical part of the electronic device 100, or can be physically separate from the electronic device 100. As appropriate, the sensor 102 may communicate with parts of the electronic device 100 using any one or more of the following: buses, networks, and other wired or wireless interconnections. Examples include I²C, SPI, PS/2, Universal Serial Bus (USB), Bluetooth, RF, and IRDA.

The device 100 may utilize any combination of sensor components and sensing technologies to detect user input in the sensing region. The device 100 comprises one or more sensing elements for detecting user input. For example, the device 100 may use capacitive techniques, where voltage or current is applied to create an electric field. Nearby input objects cause changes in the electric field, and produce detectable changes in capacitive coupling that may be detected as changes in voltage, current, or the like.

One exemplary capacitive technique utilizes "mutual capacitance" (or "trans-capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "Tx electrodes" or "TX") and one or more receiver sensor electrodes (also "receiver electrodes" or "Rx electrodes" or "RX"). Transmitter sensor electrodes may be modulated relative to a reference voltage to transmit transmitter signals. The reference voltage may be a substantially constant voltage in various embodiments, or the reference voltage may be system ground. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals).

It will be appreciated that embodiments of this disclosure are also usable in environments utilizing "self-capacitance" techniques. "Self capacitance" (or "absolute capacitance") sensing methods are based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects. In another implementation, an absolute capacitance sensing method operates by modulating a drive ring or other conductive element that is ohmically or capacitively coupled to the input object, and by detecting the resulting capacitive coupling between the sensor electrodes and the input object. The reference voltage may by a substantially constant voltage or a varying voltage and, in various embodiments, the reference voltage may be system ground.

In certain embodiments, sensor 102 is a biometric sensor utilizing one or more various electronic sensing technologies to capture an image of a biometric pattern, such as a fingerprint, palm print, handprint, or vein pattern of a user. In certain embodiments, the biometric sensor is a capacitive fingerprint sensor that utilizes mutual capacitance sensing techniques between sensor electrodes in a second mode to detect presence of a finger or other biometric object in a sensing area. In a fingerprint sensor embodiment, for example, upon detection of a finger, the fingerprint sensor may utilize a full array of sensor electrodes in a first mode to capture or acquire an image of a fingerprint in the sensing area using mutual capacitance or self-capacitance sensing techniques. By way of example, the sensor electrodes used to detect presence of a finger in the second mode may be separate presence sensing electrodes, or they may be a selected subset, or all, of the electrodes used to capture the image of the fingerprint.

Turning now to the processing system 104 from FIG. 1, basic functional components of the electronic device 100 utilized during capturing and storing a user fingerprint image are illustrated. The processing system 104 includes a processor(s) 106, a memory 108, a template storage 110, an operating system (OS) 112 and a power source(s) 114. Each of the processor(s) 106, the memory 108, the template storage 110, the operating system 112 and power source 114 are interconnected physically, communicatively, and/or operatively for inter-component communications.

As illustrated, processor(s) 106 is configured to implement functionality and/or process instructions for execution within electronic device 100 and the processing system 104. For example, processor 106 executes instructions stored in memory 108 or instructions stored on template storage 110. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. The template storage 110 is generally configured to store enrollment views for fingerprint images for a user's fingerprint. The template storage 110 may further be configured for long-term storage of information. In some examples, the template storage 110 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The processing system 104 also hosts an operating system 112. The operating system 112 controls operations of the components of the processing system 104. For example, the operating system 112 facilitates the interaction of the processor(s) 106, memory 108 and template storage 110.

The processing system 104 includes one or more power sources 114 to provide power to the electronic device 100. Non-limiting examples of power source 114 include singleuse power sources, rechargeable power sources, and/or power sources developed from nickel-cadmium, lithium-ion, or other suitable material.

The processing system 104 is configured to or adapted to control operation of sensor 102, e.g., implement the various processes, including the settlement detection and full scan imaging processes, as described herein. For example, the processing system 104 may be implemented in part or in whole as a control circuit that controls operation of the sensor 102 to drive transmitter electrode(s) using one or a plurality of physical transmitter leads, to receive signals from receiver electrodes(s) using one or a plurality of physical receiver leads, and to process receiver electrode signals as described herein. Additionally, the control circuit including processing system 104 may be physically separate from and communicably coupled with the main processing system controlling overall operation of the device 100, which includes or is couple to sensor 102.

Fingerprint sensors are sometimes referred to as swipe sensors or placement sensors depending on their principle of operation. Typically, swipe sensors capture an image that is larger than the sensing area by capturing a series of scans of the fingerprint as the user swipes or otherwise moves their finger over the sensing area. A processing system then reconstructs the scans into a larger swipe image. Since the image is reconstructed from a series of scans, this allows the sensing array to be made small, such as a small two-dimensional array or even as small as a single linear array, while still capturing a series of scans that can be reconstructed into a larger area image. Placement sensors typically capture an image that corresponds to the size of the sensing area by capturing scans of the fingerprint as it is placed or otherwise held over the sensing area. Usually, placement sensors include a two dimensional sensor array that can capture a sufficient area of the fingerprint in a single scan, allowing the fingerprint image to be captured without the user having to move the finger during the image capture process.

Figure 2:
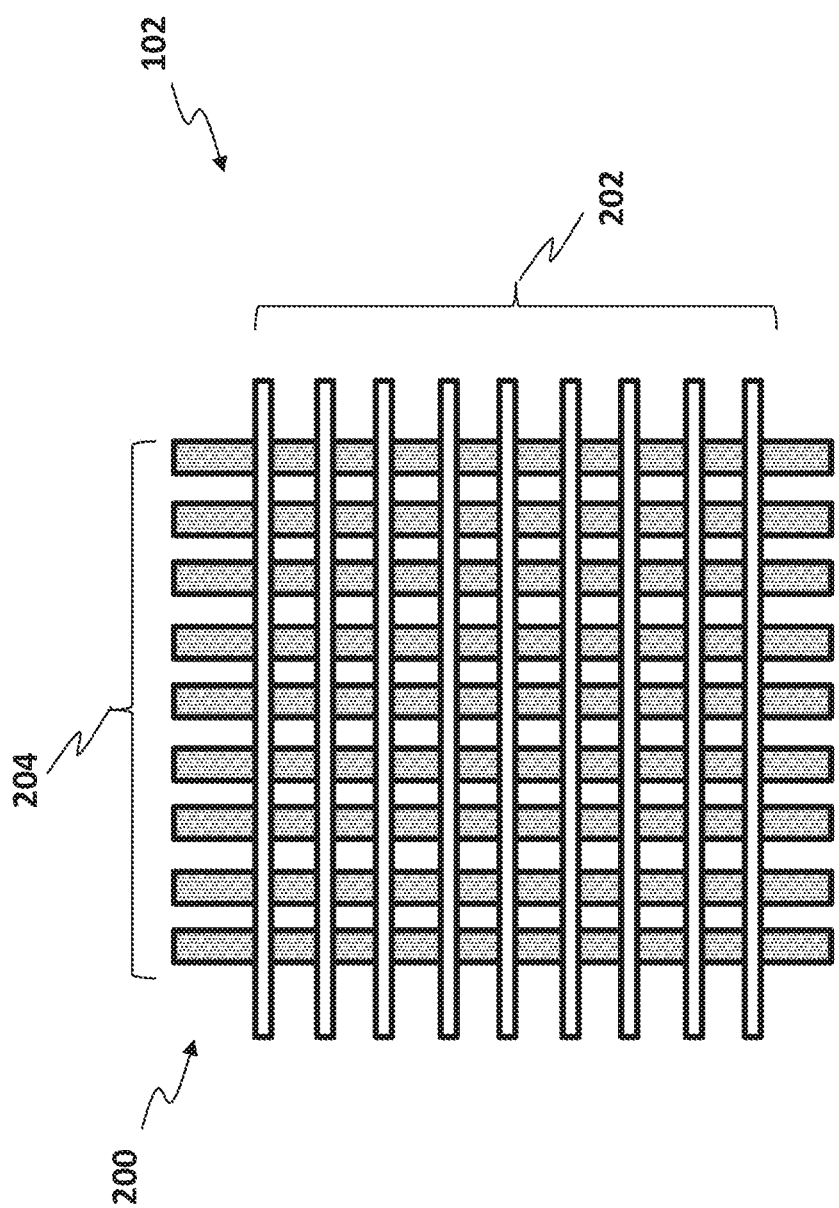
FIG. 2 is a schematic view of a capacitive sensor, in accordance with an embodiment of the disclosure.

FIG. 2 illustrates an exemplary embodiment of the sensor 102 in accordance with the disclosure contained herein. FIG. 2 illustrates an embodiment of the sensor 102 configured as a capacitive sensor that includes a plurality of electrodes 200, including a set of transmitter electrodes 204 and a receiver electrode 204, arranged in a two-dimensional array of pixels. A pixel is formed at the capacitive coupling between each of the transmitter electrodes 204 and the receiver electrode 204. In the depicted embodiment, the sensor electrodes 200 are operated to capture an image of a fingerprint by driving transmitter signals onto each of the transmitter signals 204, and detecting resulting signals at the receiver electrode 203 that correspond to the transmitter signals. In one implementation, the transmitter signals are driven onto each of the transmitter electrodes 204 one at a time, in a sequence one after another. In another implementation, transmitter signals are driven onto multiple transmitter electrodes simultaneously, using a code division multiplexing (CDM) or time-division multiplexing (TDM) sensing scheme.

In certain embodiments, a separate control circuit such as an integrated circuit (IC) may be configured to control operation of sensor 102 by providing drive signals to the transmitter via one or a plurality of dedicated transmitter leads or pins, and by receiving receiver signals via one or a plurality of dedicated receiver leads or pins. The control circuit may process the receiver signals, and/or provide the signals to a different system for processing, to determine object presence.

In the sensor 102 of FIG. 2, rows of receiver electrodes 202 overlap columns of transmitter electrodes 204 to form a pixel based on a capacitive coupling at each overlap location. In one implementation, the receiver electrodes 202 and transmitter electrodes 204 are formed on the same substrate. In another implementation, they are formed on different substrates. In either case, dielectric material may separate the set of transmitter electrodes 204 and the set of receiver electrodes 202 at each overlap location, and one of the sets may be closer to a sensing area where a finger or other object is placed. In one implementation, the receiver electrodes 202 are disposed closer to a sensing area of the capacitive sensor 102, and selected receiver electrodes are operated in a low power mode to detect a presence of a finger.

In the embodiment illustrated in FIG. 2, the transmitter electrodes 204 and receiver electrodes 202 are depicted as sets of bars and stripes, respectively. The transmitter electrodes 204 each extend parallel to each other, and the receiver electrodes 202 also extend parallel to each other, in a different direction from the transmitter electrodes to form a two-dimensional array of pixels. In the illustrated embodiment, the transmitter electrodes and receiver electrodes extend perpendicular to each other. The transmitter electrodes and receiver electrodes may be formed, for example, on separate respective substrates, or opposing sides of the same substrate, and in either case the substrate material may separate the transmitter electrodes 204 and receiver electrodes 202 to form capacitive gaps between them at each overlap location.

It will be appreciated that other sensor array patterns are possible without departing from the principles described herein. For example, other electrode shapes such as diamond patterns or other geometrical patterns are possible without departing from certain principles described herein. Similarly, other electrode orientations besides perpendicular rows and columns are possible without departing from certain principles described herein. It will also be appreciated that transmitter signals can be driven onto each of the transmitter electrodes 204 and resulting signals can be detected at each of the receiver electrodes 202 using a variety of modulation schemes in order to capture an image of the sensing area. In one embodiment, the transmitter signals are driven onto each of the transmitter electrodes 204 one at a time, in a sequence one after another. In another embodiment, transmitter signals are driven onto multiple or all transmitter electrodes simultaneously and/or resulting signals are detected at each of one or multiple receiver electrodes simultaneously, using a code division multiplexing (CDM) or time-division multiplexing (TDM) sensing scheme. Examples of multiplexing signals useful in the context of the transmitter electrodes and receiver electrode(s) of the present disclosure can be found in U.S. Pat. No. 8,558,811, which is hereby incorporated by reference herein in its entirety.

In one embodiment, the illustrated electrode and circuit arrangements may depict a selected subset or all of electrodes 200 from the sensor 102 re-used for finger presence detection, in accordance with principles described herein. In another embodiment, the electrode and circuit arrangements may depict dedicated electrodes utilized for finger presence detection, in accordance with principles described herein. Regardless of whether the arrangement of electrodes and the associated circuitry is configured to re-use selected sensor electrodes from sensor 102 or are dedicated for finger presence detection and separate from the sensor 102, the techniques and principles disclosed herein are applicable.

Receive electrodes 302 are configured to detect resulting signals corresponding to the transmitter signal driven onto transmitter electrodes 204. The resulting signals may be provided to an amplifier. Accordingly, a resulting output is a low noise gain signal that correlates to an amount of energy capacitively coupled from the transmit electrodes 204 to the receiver electrodes 202. The amount of energy coupled from a transmitter electrode 304 to a receiver electrode 202 is affected by the presence of a biometric object such as a fingerprint. When a biometric object is present in the sensing area of a capacitive sensor 200, the output will be less in value than when no biometric object is present. In this regard, the output of the capacitive sensor 200 can be utilized for finger presence detection.

For finger presence detection, the output of the capacitive sensor 102 is compared to a threshold signal level to determine if the processing system 104 may maintain operation of the capacitive sensor 102 and the device 100, in general, in the second mode (i.e., low power) or return operation to the first mode (i.e., higher power—settlement detection and/or imaging mode).

As discussed above, it is often desirable to determine when an input object, such as a finger, has settled on the input surface of a sensor device. Embodiments provide scan techniques that quickly and efficiently detect input object settlement. In certain embodiments, multiple Tx and Rx electrodes are simultaneously used to save time to detect input object settlement before acquiring a full image scan, e.g., for matching or authentication.

Figure 3:
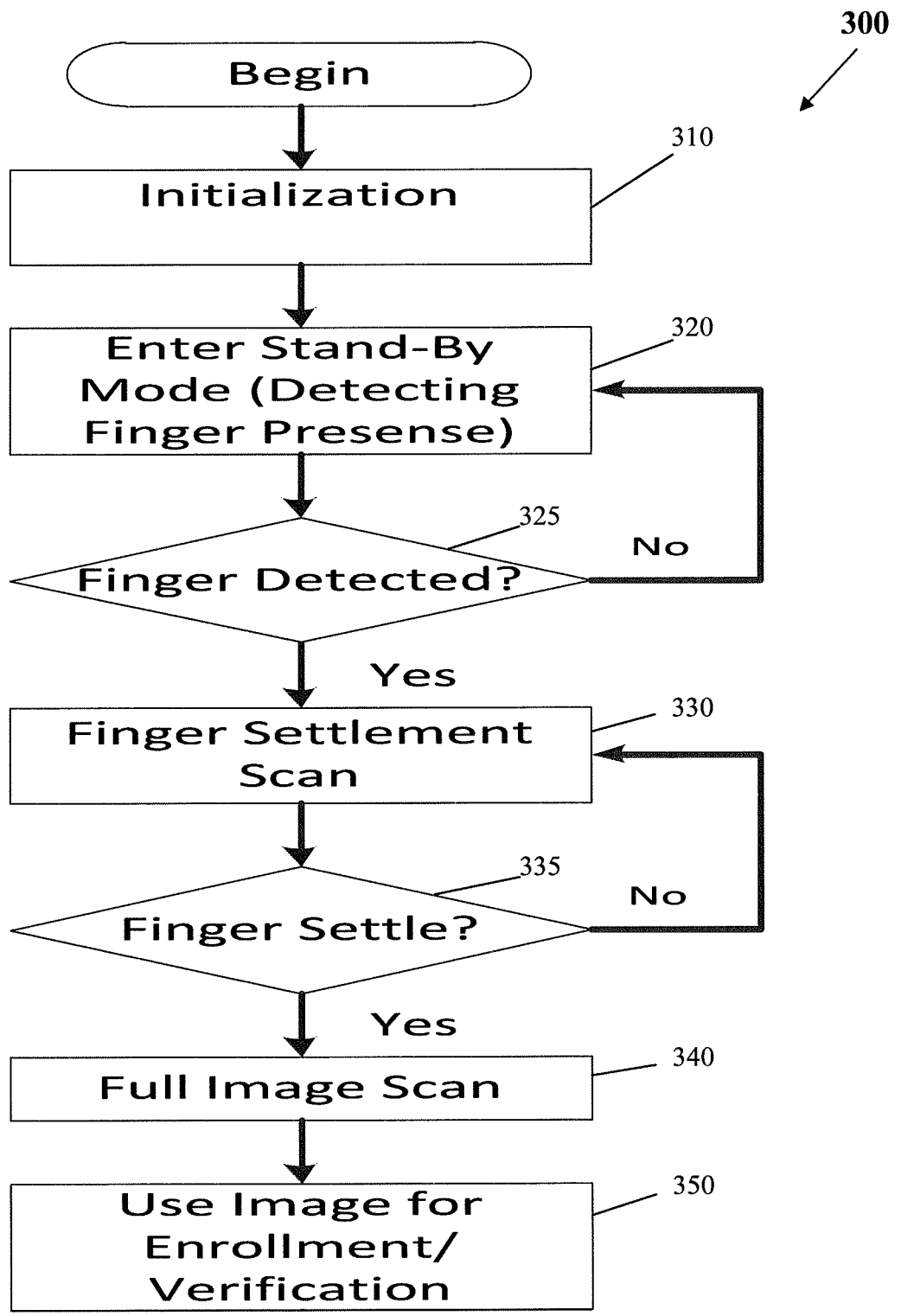
FIG. 3 illustrates an input object settlement detection method according to an embodiment.

FIG. 3 illustrates a method 300 of determining input object settlement according to an embodiment. In step 310, the system, e.g., processing system 104, is initialized. For example, operation mode switching parameters may be set.

In an embodiment, a presence detection response event is initialized; a wake-on-finger (WOF) event may be set up or initialized to trigger further processing when presence of an input object such as a finger is detected. In step 320, the sensor system enters a low-power, stand-by mode. In the stand-by mode, the sensor may be configured to periodically sense whether a fingerprint or other biometric object is present on or proximal to an input surface by performing a series of one or more low-power finger presence detection scans. In an embodiment, detection of the presence of a finger at 325 transitions the system to a different mode of operation. For example, in response to a determination that an input object, e.g., finger, is present proximal to or on the input surface at 325, the processing system transitions to an input object settlement determination mode to determine when the input object, e.g., finger, has settled sufficiently to warrant using more system resources to capture a full image scan of the settled object.

In step 330, a series of one or more fast input object settlement scans are captured or acquired by the sensor 102 until it is determined that the input object is settled sufficiently to take a full image scan of the settled object. In an embodiment, capturing or acquiring a settlement scan includes driving all or a portion of the available transmitter electrodes simultaneously and detecting receiver signals using a subset of the active or available receiver electrodes. For example, where M transmitter electrodes and N receiver electrodes are present in a sensor device, all or a portion of the M transmitter electrodes are driven simultaneously by applying distinct modulation signals in a series of electrode drive steps or stages to the transmitter electrodes, and receiver signals are detected from a subset of the N receiver electrodes.

In a code division multiplexing (CDM) embodiment, a set of multiple distinct modulation signals are applied in a series of drive steps to the transmitter electrodes and the resultant signals are detected by the receiver electrode(s) and demodulated to discriminate electrical effects produced by an input object on or proximal to the input surface. Each distinct modulation signal is made up of the individual coded waveforms to be applied to each Tx electrode individually. In a given drive stage or step time period, one of the distinct modulation signals is applied to the Tx electrodes; each individual coded waveform (e.g., a periodic signal) making up the distinct modulation signal is applied to each Tx electrode individually, and those individual waveforms making up the distinct modulation signal are simultaneously applied across the multiple Tx electrodes. Some of those individual coded waveforms can be the same as each other (e.g., TX1, TX3, and TX4 may have the same frequency, and same phase, and same magnitude as each other, and those waveforms can be applied to TX1, TX3, and TX4 simultaneously), while others of those coded waveforms that are simultaneously applied can be different (e.g., TX2, TX5, and TX6 may have a phase that is different than the phase of the waveforms applied to TX1, TX3, and TX4, but otherwise be the same frequency and magnitude). For all drive stages or steps, say M stages or steps in this case where there are M Tx electrodes, each distinct modulation signal (where a single "distinct modulation signal" is a conglomeration or combination of the M individual coded waveforms applied separately, but simultaneously, to the M Tx electrodes) will have a different phase from all other distinct modulation signals in the set of multiple, M, distinct modulation signals. For example, between any two different drive steps or stages, at least one of the individual coded waveforms (e.g., applied to $TX_N$, where N=1 . . . M) making up the "distinct modulation signal" applied in one stage or step will have a different phase than the same individual coded waveform (applied to $TX_N$) making up the "distinct modulation signal" applied in the other stage or step).

For a full image sensor scan, as an example, all M transmitter electrodes may be driven simultaneously with each distinct modulation signal in a set of M distinct drive modulation signals produced as a function of any number of distinct digital codes. For example, for 144 transmitter electrodes, 144 distinct drive modulation signals are applied to the transmitter electrodes in 144 drive steps. Each distinct modulation signal has a different phase than the other distinct modulation signals (i.e., between any two drive steps or stages, at least one individual coded waveform applied to a particular Tx electrode is orthogonal to or of different phase to the individual coded waveform applied to the same Tx electrode in the other step or stage). For example, portions of three distinct modulation signals to be applied to a subset of three transmitter electrodes ( . . . $TX_{N-1}$, $TX_N$, $TX_{N+1}$ . . . ) may be represented as follows:

a. [$TX_{N-1}$, $TX_N$, $TX_{N+1}$]=[1,1,1];
b. [$TX_{N-1}$, $TX_N$, $TX_{N+1}$]=[1,1,-1];
c. [$TX_{N-1}$, $TX_N$, $TX_{N+1}$]=[-1,1,1].

For distinct modulation signal a), the coded waveform ("1") applied to $TX_{N+1}$ is orthogonal to the coded waveform ("-1") applied to $TX_{N+1}$ in distinct modulation signal b), and hence distinct modulation signal a) is orthogonal to or of different phase from distinct modulation signal b). Similarly, for distinct modulation signal c), the coded waveform ("-1") applied to $TX_{N-1}$ is orthogonal to the coded waveform ("1") applied to $TX_{N-1}$ in distinct modulation signal a), and hence, distinct modulation signal a) is orthogonal to or of different phase from distinct modulation signal c). In some embodiments, certain transmitter electrodes need not be driven, or need not be active. In such embodiments, the above distinct modulation signals might be represented as follows, where $TX_N$ is not driven, or is not active:

a. $[TX_{N-1}, TX_N, TX_{N+1}]=[1,0,1]$;
b. $[TX_{N-1}, TX_N, TX_{N+1}]=[1,0,-1]$;
c. $[TX_{N-1}, TX_N, TX_{N+1}]=[-1,0,1]$.

To implement a fast settlement scan according to an embodiment, some or all of the M transmitter electrodes are simultaneously driven using a subset or a portion of the full set of M distinct modulation signals that would be applied during a full sensor scan. For example, for a full sensor scan, the full set of distinct modulation signals is applied to the transmitter electrodes in a sequence, with each distinct modulation signal being applied to the transmitter electrodes simultaneously. As each modulation signal is applied, a receiver signal is detected by each receiver electrode that is present or active. In some embodiments, a single receiver electrode is used, and in other embodiments multiple receiver electrodes are used. For example, in some embodiments, a subset of the full set of N available receiver electrodes are used to detect resultant signals, e.g., two-thirds of all receiver electrodes, half of all receiver electrodes, less than half of all receiver electrodes, one quarter of all receiver electrodes, one-eighth of all receiver electrodes, etc, are active to detect signals. As an example, for devices where receiver electrodes are multiplexed with amplifiers, e.g., four electrodes per amplifier, one or two receiver electrodes per amplifier may be used for detection. The receiver electrodes used to detect resultant signals may be evenly distributed from among all receiver electrodes (e.g., every fourth receiver electrode as an example), or they may be unevenly distributed (e.g., $1^{st}$, $11^{th}$ and $19^{th}$ out of 20 receiver electrodes as an example of uneven distribution). In certain embodiments, at least one electrode proximal to a center of the receiver electrodes and at least one electrode proximal to a periphery of the electrodes are used.

For the fast settlement detection scan, the subset of the full set of distinct modulation signals used may comprise a small portion, e.g., 1% or 2% or more of the existing modulation signals. Using a subset reduces the time taken to apply the modulation signals concomitantly, yet the entire sensor is still "sensed" since for each drive step, all active transmitter electrodes are driven simultaneously. For example, if 200 drive signals are present in the full set and only 1% (2 distinct modulation signals) of the 200 distinct modulation signals are used for the settlement scan, then only 1% of the time needed to apply all modulation signals for a full scan would be used to implement a settlement scan.

For the settlement scan, the subset of the full set of distinct modulation signals is applied in a sequence. The sequence of any modulation signals applied during the settlement scan may be different than in the full scan. For example, if only the first (1), fifth (5) and tenth (10) distinct modulation signals are applied, they need not be applied in order of 1, 5, 10 and may be applied in the order of 5, 1, 10 as an example. During each settlement scan drive step, one distinct modulation signal of the subset of the full set of distinct modulation signals that would be applied to the transmitter electrodes during a full sensor scan is applied to the transmitter electrodes, and each subsequent drive step includes applying a different one of the subset of distinct modulation signals in the sequence, wherein the subset comprises less than all of the full set of distinct modulation signals.

Returning to FIG. 3, in decision step 335, a determination is made as to whether the settlement scan captured or acquired in step 330 is sufficiently similar to a previous settlement scan. For the first settlement scan, there may be no previous scan to compare with, so processing loops back to step 330 to acquire a second settlement scan. The second, current settlement scan is then compared with the first settlement scan in step 335. In subsequent iterations of step 335, when necessary, each current settlement scan may be compared with a previous settlement scan. In certain embodiments, processing step 335 compares consecutive scans. For example, for a fourth settlement scan, comparison step 335 will compare the current fourth scan with the third scan. In other embodiments, processing step 335 compares a current settlement scan with any previous settlement scan. For example, for a fourth settlement scan, comparison step 335 may compare the fourth scan with the third scan, the second scan or the first scan, or an average value of the some or all of the previous scans.

Figure 4:
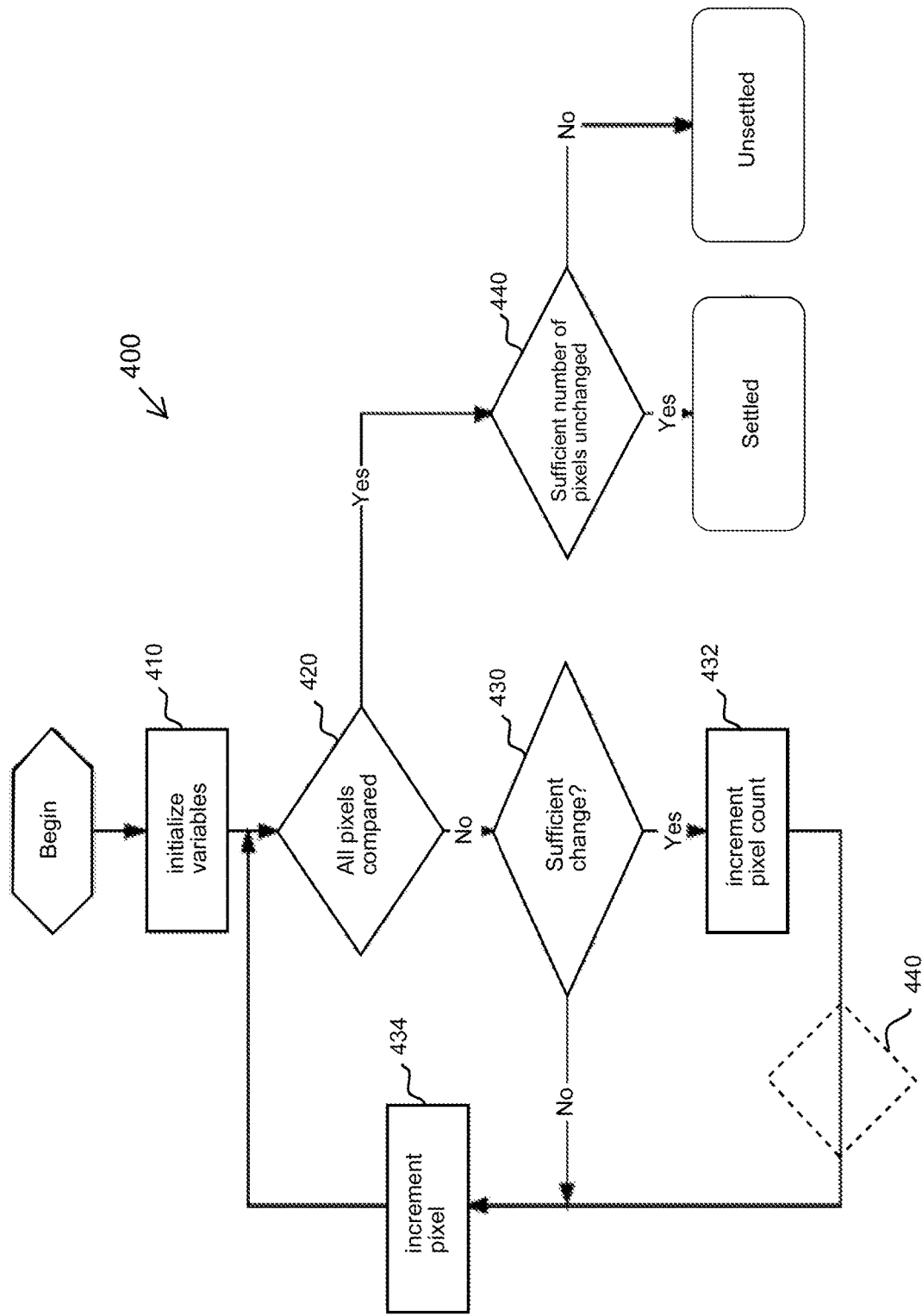
FIG. 4 illustrates a method of comparing two subsequent settlement scan images to determine fingerprint settlement according to an embodiment.

In step 335, in one embodiment, if a difference between the current settlement scan and a previous settlement scan is less than a threshold value, the input object is determined to have settled sufficiently to warrant acquiring a full sensor scan image. Alternatively, if a difference between the current settlement scan and a previous settlement scan exceeds a threshold value, the input object is determined to not have settled sufficiently to warrant acquiring a full sensor scan image. In one embodiment, for comparison of images, as an example, each pixel of a current settlement scan used in the determination may be compared with corresponding pixels in a previous settlement scan, and a threshold value may be based on a minimum, or a maximum, difference for one or multiple pixels. FIG. 4, discussed below in more detail, below illustrates an embodiment for comparing subsequent settlement scans. The threshold may be based on a summation of some or all pixel values. One skilled in the art will recognize many other ways of comparison to determine sufficiency of object settlement to warrant full sensor image acquisition. If the determination in step 335 indicates that the current settlement scan has changed sufficiently to not warrant full image acquisition (e.g., object not settled), the processing returns to step 330 and another settlement scan is acquired. On the next iteration of determination step 335 the previously acquired settlement scan that was being used as the current scan may be used as the previous scan in the comparison step 335.

When it has been determined that the settlement scan is sufficiently similar to a previous settlement scan, processing proceeds to step 340 and a full sensor scan is captured or acquired by the imaging system. In an embodiment, one or more fingerprint images are captured during processing step 340 for use in later processing steps. For example, processing step 350 may include matching and authentication processing steps. A full image acquired in step 340 may be used for matching, authentication or enrollment, or a stored baseline image may be subtracted from the full image acquired in step 340 and the baseline-subtracted image may be used for matching, authentication or enrollment. When finished, processing may proceed to additional processing steps or my return to the stand-by mode of operation (step 320).

FIG. 4 illustrates a method 400 of comparing two subsequent settlement scan images to determine fingerprint settlement according to an example embodiment. In the example, it will be assumed that there are 144 transmitter electrodes and 56 receiver electrodes, and that every fourth receiver electrode is active, e.g., 14 receiver electrodes active to simultaneously detect, and that 9 of the 144 distinct modulation signals are applied (i.e., 9 drive steps). The scan images being compared are indicated in the example as "CurB" for the current scan image, and "PrevB" for a previous scan image. In step 410, variables are initialized. For example, pixel index, i, and change count, cnt, variables are initialed to 0. In step 420, a determination is made as to whether all pixels in the two images have been compared. For example, the pixel index, i, is compared with the number of pixels in the images to be compared. If all pixels have been compared, the process proceeds to step 440 and if not, the process proceeds to step 430. For example, for 9 driving steps and 14 receiver electrodes, 9*14 'pixels' are present in the scan images being compared. If the pixel index is less than the number of pixels (e.g., i<9*14), indicating that more pixels between the two subsequent images have yet to be compared in following step 430, the process proceeds to step 430. If the pixel index is equal to (or greater than) the number of pixels, indicating that all pixels between the two subsequent images have been compared, the process proceeds to step 440. Step 420 effectively guarantees that all pixels in the images being compared are compared in step 430.

In step 430, a determination is made as to whether the current pixel value has changed sufficiently between the images being compared. If so, the pixel change count variable is incremented in step 432 and then the pixel index value is incremented and processing returns to step 420 to process the next pixel; if the current pixel value has not changed sufficiently, the pixel index variable is incremented and processing returns to step 420. For example, in an embodiment, in step 430, a pixel in the current image (CurB[i]) corresponding to index i is compared with a pixel in a previous image (PrevB[i]) corresponding to index i to determine whether the pixel has changed more than a threshold value (DIFF_TH), e.g., abs(CurB[i]−PrevB[i]) <DIFF_TH. If the difference does not exceed the threshold value, the count variable, cnt, is incremented in step 432 and then the index variable, i, is incremented in step 434. If the difference does exceed (or is equal to) the threshold value, the index variable, i, is incremented in step 434 (the count variable, cnt, is not incremented in step 432). Processing proceeds iteratively for all pixels being compared, until the pixel index equals the pixel number (e.g., i=9*14).

Processing then proceeds to step 440, where a determination is made as to whether a sufficient number of pixels have not changed in value between successive or subsequent scans to confirm the input object, e.g., finger, is settled sufficiently. For example, if the change count variable, cnt, is greater than a threshold number of pixels (CNT_TH), e.g., cnt>CNT_TH, the input object is determined to be settled. If not, the input object is determined to not be settled and a further scan may be initiated (Step 330 of FIG. 3). Accordingly, the present method 400 counts the number of pixels (cnt) that change less than a preset pixel change threshold limit (DIFF_TH) between subsequent partial scan images and if the count (cnt) is larger than a preset count change threshold limit (CNT_TH), indicating that the image has not changed sufficiently between the subsequent scans, the finger is determined to be settled.

In an alternate embodiment, step 440 may be implemented between steps 432 and 434. In this embodiment, the number of pixels (cnt) that change less than a preset limit (DIFF_TH) between subsequent partial scans is compared with the preset count change threshold limit (CNT_TH) each time the change count variable, cnt, is incremented.

It will be appreciated that other methods for comparing subsequent settlement scan images may be used to determine input object settlement.

The present system and method embodiments advantageously take less time and consume less power than prior settlement detection technologies. For example, consider the case of an example fingerprint sensor system that consumes about 100 mS of time to acquire a full image scan using 144 transmitter electrodes and 56 receiver electrodes, and 14 receiver electrodes active to simultaneously detect (4 detection steps may be needed to detect using all 56 receiver electrodes), and that 10 of the 144 distinct modulation are applied (i.e., 10 drive steps). In this example, each settlement scan takes 10/(4*144)=1.7% of a full frame scan. Hence, if the full scan consumes 100 mS, then each settlement scan consumes only 1.7 mS. In this manner, time and energy resources are conserved relative to prior techniques.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Certain embodiments are described herein. Variations of those embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A method of operating a capacitive sensor having a plurality, M, of transmitter electrodes and a plurality, N, of receiver electrodes, wherein N and M are integer values, the method comprising:

capturing a plurality of input object settlement scans, when a presence of an input object is detected, wherein capturing each input object settlement scan includes driving all or a portion of the plurality, M, of transmitter electrodes and detecting receiver signals from a subset of the plurality, N, of receiver electrodes, wherein the driving all or a portion of the plurality, M, of transmitter electrodes includes applying a driving subset of a plurality, M, of distinct modulation signals in a sequence to all or the portion of the plurality, M, of transmitter electrodes, the driving subset comprising M−X of the plurality, M, of distinct modulation signals, wherein X is an integer value less than M;

determining whether a difference between subsequent input object settlement scans is below a threshold value; and in response to the difference being below the threshold value, acquiring a full input object image.

2. The method of claim 1, wherein acquiring the full input object image includes applying a plurality, M, of distinct modulation signals in a sequence to the plurality, M, of transmitter electrodes simultaneously.

3. The method of claim 1, wherein the driving all or a portion of the plurality, M, of transmitter electrodes includes driving every other transmitter electrode simultaneously.

4. The method of claim 1, wherein the driving all or a portion of the plurality, M, of transmitter electrodes includes driving at least one transmitter electrode proximate to a center of the transmitter electrodes and at least one transmitter electrode proximal to a periphery of the transmitter electrodes.

5. The method of claim 1, wherein the subset of the plurality, N, of receiver electrodes includes at least one receiver electrode proximate to a center of the receiver electrodes and at least one receiver electrode proximal to a periphery of the receiver electrodes.

6. The method of claim 1, further comprising comparing the full input object image with a stored image to determine whether a match occurs.

7. The method of claim 1, wherein the capacitive sensor is a capacitive fingerprint sensor and wherein the input object is a fingerprint.

8. The method of claim 1, wherein the determining whether a difference between subsequent input object settlement scans is below a threshold value includes counting a number of pixels in a subsequent settlement scan that are below a threshold difference relative to a prior settlement scan and determining whether the number of pixels below the threshold difference are below a threshold count of pixels.

9. An electronic system for capacitive sensing, the electronic system comprising:

a capacitive sensor configured to capacitively sense an input object in proximity to a plurality of sensor electrodes comprising a plurality, M, of transmitter electrodes, and a plurality, N, of receiver electrodes, wherein N and M are integer values;

a processing system configured to drive the plurality, M, of transmitter electrodes and to detect receiver signals from the plurality, N, of receiver electrodes, wherein the processing system is configured to control the capacitive sensor to:

capture a plurality of input object settlement scans, when a presence of an input object is detected, wherein capture of each input object settlement scan includes driving all or a portion of the plurality, M, of transmitter electrodes and detecting receiver signals from a subset of the plurality, N, of receiver electrodes, wherein the driving includes applying a driving subset of a plurality, M, of distinct modulation signals in a sequence to all or the portion of the plurality, M, of transmitter electrodes, the driving subset comprising M−X of the plurality, M, of distinct modulation signals, wherein X is an integer value less than M;

determine whether a difference between subsequent input object settlement scans is below a threshold value; and in response to the difference being below the threshold value, acquire a full input object image.

10. The electronic system of claim 9, wherein the processing system is configured to control the capacitive sensor to acquire the full input object image by applying a plurality, M, of distinct modulation signals in a sequence to the plurality, M, of transmitter electrodes simultaneously.

11. The electronic system of claim 9, wherein the driving all or a portion of the plurality, M, of transmitter electrodes includes driving every other transmitter electrode simultaneously.

12. The electronic system of claim 9, wherein the driving all or a portion of the plurality, M, of transmitter electrodes includes driving at least one transmitter electrode proximate to a center of the transmitter electrodes and at least one transmitter electrode proximal to a periphery of the transmitter electrodes.

13. The electronic system of claim 9, wherein the processing system is further configured to analyze the full input object image or to provide the full input object image to a host processing system for analysis.

14. The electronic system of claim 9, wherein the processing system is configured to determine whether the difference between subsequent input object settlement scans is below a threshold value by counting a number of pixels in a subsequent settlement scan that are below a threshold difference relative to a prior settlement scan and determining whether the number of pixels below the threshold difference are below a threshold count of pixels.

15. An electronic device for capacitive fingerprint sensing, the electronic device comprising:

a capacitive fingerprint sensor having a plurality of sensor electrodes comprising a plurality, M, of transmitter electrodes, and a plurality, N, of receiver electrodes, wherein N and M are integer values, wherein the capacitive fingerprint sensor is configured to capacitively sense an input fingerprint on an input surface in proximity to the plurality of sensor electrodes;

a processing system comprising one more processing elements, the processing system coupled to the capacitive fingerprint sensor and configured to drive the plurality, M, of transmitter electrodes and to detect receiver signals from the plurality, N, of receiver electrodes, wherein the processing system is configured to control the capacitive sensor to:

capture a plurality of input fingerprint settlement scans, when a presence of an input fingerprint is detected, wherein capture of each input fingerprint settlement scan includes driving all or a portion of the plurality, M, of transmitter electrodes and detecting receiver signals from a subset of the plurality, N, of receiver electrodes, wherein the driving includes applying a driving subset of a plurality, M, of distinct modulation signals in a sequence to all or the portion of the plurality, M, of transmitter electrodes, the driving subset comprising M–X of the plurality, M, of distinct modulation signals, wherein X is an integer value less than M;

determine whether a difference between subsequent input fingerprint settlement scans is below a threshold value; and in response to the difference being below the threshold value, acquire a full input fingerprint image.

16. The electronic device of claim 15, further including a glass or polymer material overlaying the capacitive fingerprint sensor, wherein a surface of the glass or polymer material comprises the input surface.

17. The electronic device of claim 15, wherein the processing system is configured to control the capacitive fingerprint sensor to acquire the full input fingerprint image by applying a plurality, M, of distinct modulation signals in a sequence to the plurality, M, of transmitter electrodes simultaneously.

18. The electronic system of claim 15, wherein the processing system is configured to determine whether the difference between subsequent input object settlement scans is below a threshold value by counting a number of pixels in a subsequent settlement scan that are below a threshold difference relative to a prior settlement scan and determining whether the number of pixels below the threshold difference are below a threshold count of pixels.

* * * * *